US008022994B2

(12) United States Patent
Luo et al.

(10) Patent No.: US 8,022,994 B2
(45) Date of Patent: Sep. 20, 2011

(54) IMAGE SENSOR WITH HIGH DYNAMIC RANGE IN DOWN-SAMPLING MODE

(75) Inventors: Xiaodong Luo, San Jose, CA (US); Hongli Yang, Saratoga, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 887 days.

(21) Appl. No.: 11/849,129

(22) Filed: Aug. 31, 2007

(65) Prior Publication Data

US 2009/0059048 A1 Mar. 5, 2009

(51) Int. Cl.
*H04N 5/228* (2006.01)
*H04N 5/235* (2006.01)

(52) U.S. Cl. .............. 348/208.1; 348/221.1; 348/229.1

(58) Field of Classification Search .............. 348/208.1, 348/221.1, 229.1
See application file for complete search history.

(56) References Cited

U.S. PATENT DOCUMENTS

| | | | |
|---|---|---|---|
| 2004/0080652 | A1 | 4/2004 | Nonaka et al. |
| 2004/0141075 | A1 | 7/2004 | Xu et al. |
| 2006/0192873 | A1* | 8/2006 | Yaffe ........................... 348/297 |
| 2007/0045681 | A1 | 3/2007 | Mauritzson et al. |
| 2007/0273785 | A1 | 11/2007 | Ogawa et al. |
| 2007/0285526 | A1* | 12/2007 | Mann et al. ................ 348/222.1 |
| 2009/0009623 | A1* | 1/2009 | Hoshino .................... 348/222.1 |

FOREIGN PATENT DOCUMENTS

WO 2006049098 A1 5/2006
WO WO 2006/049098 A1 5/2006

OTHER PUBLICATIONS

Mase, Mitsuhito et al., "A Wide Dynamic Range CMOS Image Sensor With Multiple Exposure-Time Signal Outputs and 12-Bit Column-Parallel Cyclic A/D Converters," IEEE Journal of Solid-State Circuits, vol. 40, No. 12, Dec. 2005 pp. 2787-2795.
Schrey, O. et al., "A 1Kx1K High Dynamic Range CMOS Image Sensor With On-Chip Programmable Region of Interest Readout," *Fraunhofer Institute of Microelectronic Circuits and Systems*, Finkenstraβe 61, D-47057 Duisburg, Germany, 4 pages.
Yadid-Pecht, O. et al., "Wide Intrascene Dynamic Range CMOS APS Using Dual Sampling," IEEE Transactions on Electron Devices, vol. 44, No. 10, Oct. 1997, pp. 1721-1723.
European Search Report for Application No. 08252842.3 mailed on Nov. 24, 2008, 8 pages.
File History of related European Patent Application Serial No. 08252842.3, dated Aug. 28, 2008 through Feb. 16, 2010, 136 pages.

* cited by examiner

*Primary Examiner* — Hung Lam
(74) *Attorney, Agent, or Firm* — Lathrop & Gage LLP

(57) ABSTRACT

An image sensor has an array of photo-sensitive pixels and supports a line-by-line read out of rows. In a normal resolution each row has the same nominal gain and exposure time. In a down-sampling mode the exposure times of the rows are varied according to an alternating sequence having at least two different exposure times. During down-sampling, raw pixel data from rows with different exposure times is combined to simultaneously achieve down-sampling and a high dynamic range.

17 Claims, 4 Drawing Sheets

IMAGE SENSOR WITH HIGH DYNAMIC RANGE IN DOWN-SAMPLING MODE

FIELD OF THE INVENTION

The present invention is generally related to image sensors. More particularly the present invention is related to image sensors having a high dynamic range.

BACKGROUND OF THE INVENTION

CMOS image sensors typically include an array of pixels. Each pixel includes a photodetector that transforms incident light photons into current signals. Additionally, a pixel in a CMOS image sensor also includes other well-known elements to set the exposure time of the photodetector and perform a read out, such as a reset switch, signal amplifier, and output circuits. An individual pixel has an output that for a fixed exposure time eventually saturates with increasing light intensity.

FIG. 1 illustrates a CMOS image sensor 100. The pixel array 100 has pixels 102 arranged into a set of columns and rows having a column parallel read out architecture in which pixels in a row are read out simultaneously and processed in parallel. That is, Row 0 is read out, then Row 1, then Row 2, and so on until Row M is read out. Sample and hold (S&H) elements support the line-by-line row read out of rows. The rows in a frame have the same exposure time for full resolution modes and down-sampling modes.

CMOS image sensors are often used in applications in which both very bright and very dark conditions may be encountered. A variety of techniques have been proposed to improve the response of CMOS image sensors in a variety of light conditions. For example, U.S. Pat. Pub. US 2004/0141075, which is assigned to OmniVision Technologies, Inc. and hereby incorporated by reference, teaches that the gain and exposure time can be adjusted over a sequence of frames to compensate for varying light conditions. An adjustment in exposure time is determined by analyzing one frame and then used to make an adjustment for a subsequent frame. While the approach of U.S. Pat. Pub. US 2004/0141075 varies exposure times over a series of frames to adjust for bright and dark conditions. it does not result in an actual increase in the dynamic range of the image sensor for a particular frame. As is well known in the field of image sensors, the dynamic range is the ratio of the largest detectable signal to the smallest (which for a CMOS image sensor is often defined by the ratio of the largest non-saturating signal to the standard deviation of the noise under dark conditions).

Other techniques to improve the response of a CMOS image sensor in a variety of lighting conditions have other tradeoffs. In particular, conventional approaches to achieve a high dynamic range typically require significant increases in chip area and/or a more complex fabrication process, which increases the cost of the image sensor.

Therefore, in light of the above-described problems, what is desired is a new approach that would permit a HDR CMOS image sensor mode to be achieved in a cost-effective manner.

SUMMARY OF THE INVENTION

An image sensor includes an array of photo-sensitive pixels arranged in a row and in column format with a line-by-line read out sequence of the rows. The image sensor has a full resolution mode and at least one down-sampling mode. In a down-sampling mode the vertical pixel resolution is reduced. For a down-sampling mode having at least a 1:2 reduction in vertical resolution, a high dynamic range is also achieved by varying the exposure time of the rows according to an alternating sequence of row exposure times. Data from sets of rows that are combined to achieve down-sampling also have different row exposure times. As a result, a high dynamic range is achieved for the down-sampling mode.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
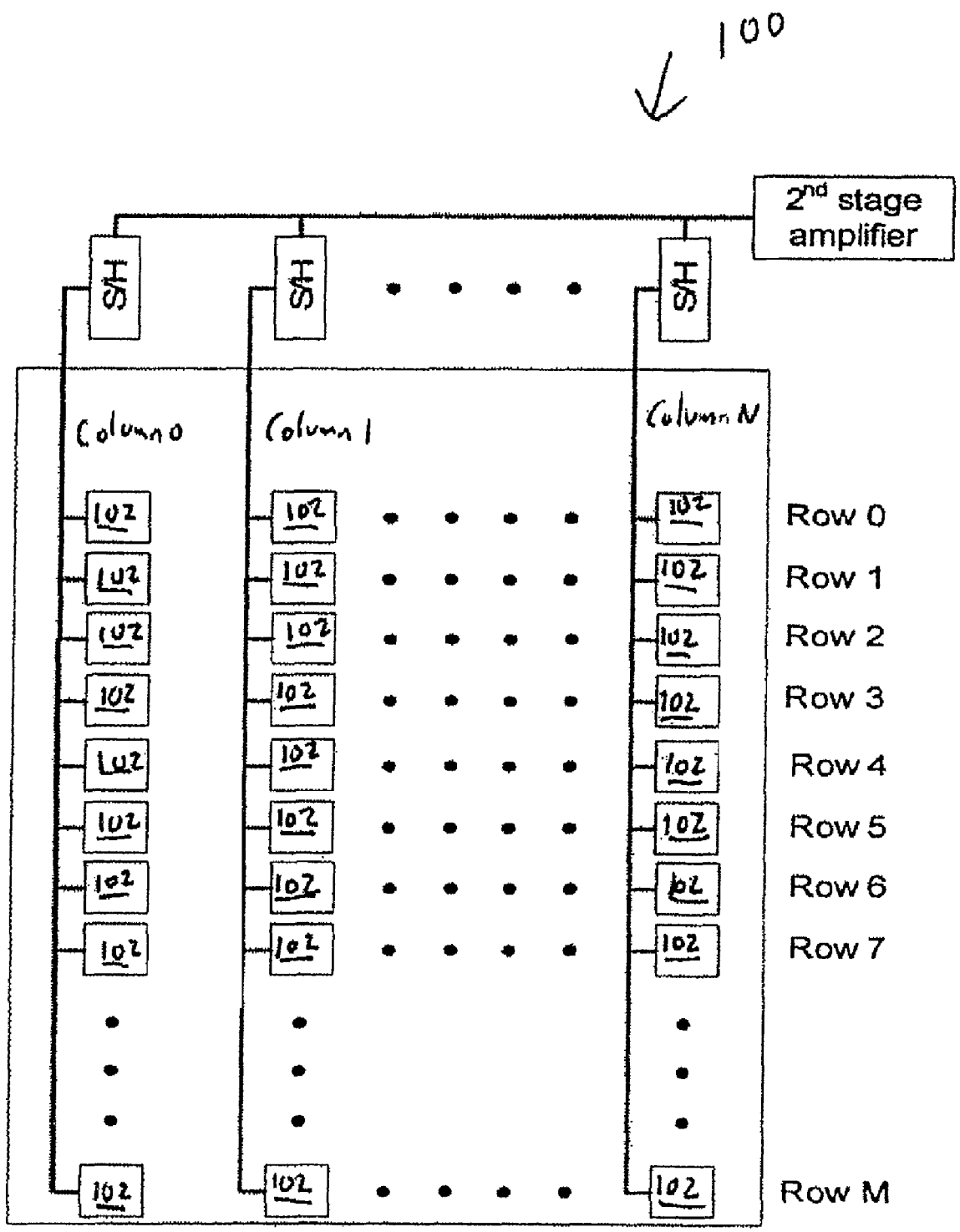
FIG. 1 illustrates operation of a conventional image sensor.
Figure 2:
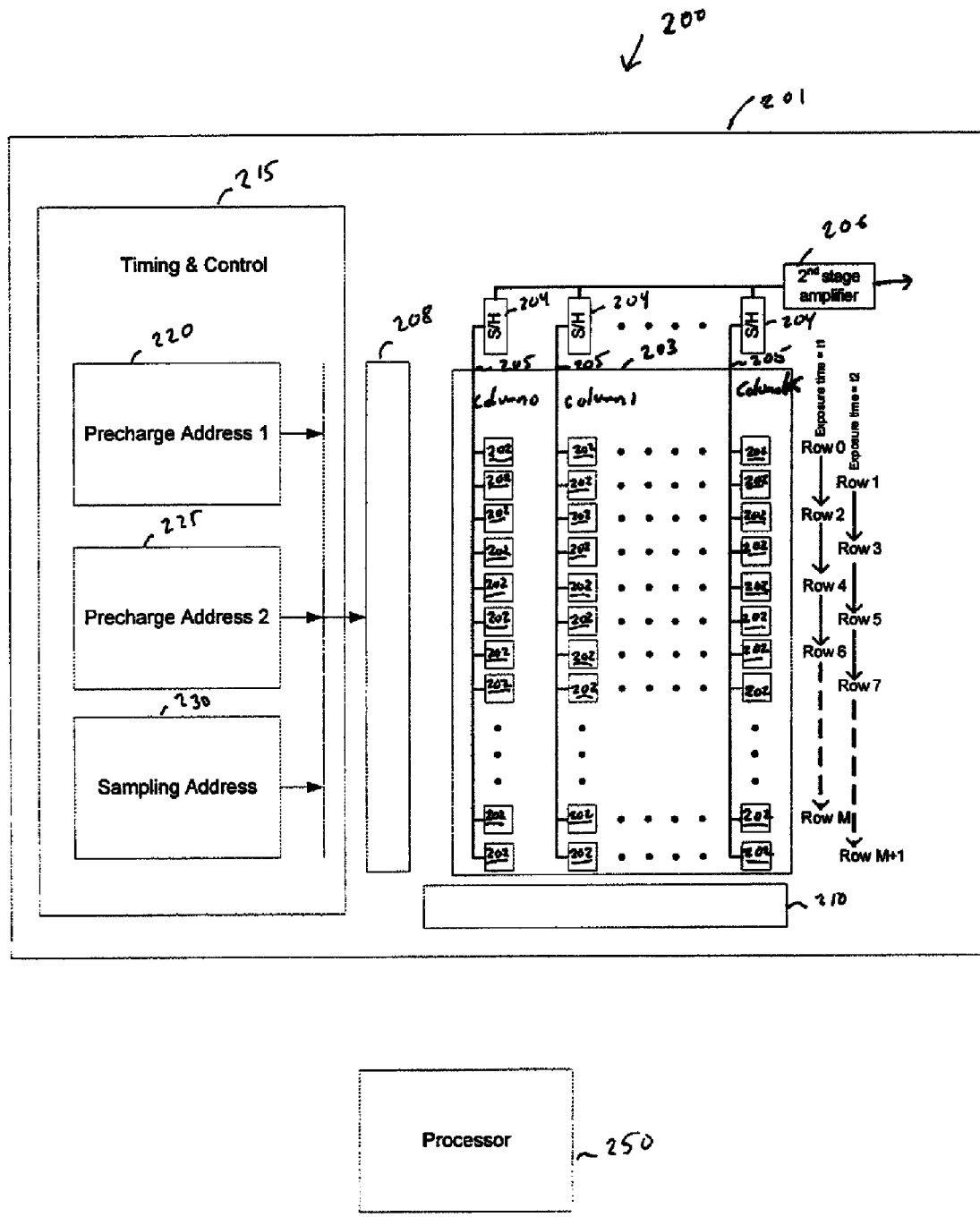
FIG. 2 illustrates an imaging system that supports a high dynamic range in a down-sampling mode in accordance with one embodiment of the present invention.

FIG. 2 is a block diagram of one embodiment of an image sensing system 200 of the present invention that supports a high dynamic range in a down-sampling mode. Some conventional well-known components are omitted for clarity. An image sensor 201 includes an array 203 of individual photo-sensitive pixels 202 arranged in rows and columns (for the purposes of clarity, some of the columns and pixels and individual pixels are omitted, as illustrated by the dots). The image sensor may, for example, be implemented as a CMOS image sensor with each pixel 202 including a photodetector and associated circuitry to support setting an exposure time and performing read out.

The array 203 is illustrated as having a column parallel read out architecture in which pixels 202 in a row are read out simultaneously and processed in parallel in a line-by-line sequence. That is, Row 0 is read out, then Row 1, then Row 2, and so on until Row M+1 is read out. Sample and Hold (S&H) elements 204 connected to each column read out line 205 support a column parallel line-by-line read out of the rows. A second stage amplifier 206 receives the outputs of the S&H elements 204. The output of the second stage amplifier 206 is provided to a processor 250. Processor 250 processes the image sensor data to generate an image. Processor 250 may, for example, be implemented as a digital signal processor having a local line memory (not shown).

A row address decoder 208 and column address decoder 210 are provided to support reading out the pixels. A timing & control block 215 supports a line-by-line row read out of pixel data and sets the exposure time of the rows. In one implementation, a pre-charge address 1 block 220, a pre-charge address 2 block 225, and a sampling address block 230 are provided to permit the exposure time of the rows to be set on a row-by-row basis to different values in a down-sampling mode to improve dynamic range. For example pre-charge address block 220 may support a normal full resolution mode with the same gain and the same exposure time for each row whereas the additional pre-charge address block 225 supports different exposure times for the rows in the down-sampling mode.

If desired, additional pre-charge address blocks (not shown) may be provided to support more than one down-sampling mode.

The resolution of an image generated by processor 250 receiving data from image sensor 201 depends upon how the raw (unprocessed) pixel data generated by photo-sensitive pixel elements is sampled and processed to generate pixels for the processed image. The term "raw pixel data" is used in this patent application to distinguish data generated by image sensor 201 from the pixel data after it has been sampled and additional processing has been performed by processor 250. In particular, the raw pixel data received from image sensor 201 can be down-sampled to reduce the effective vertical resolution of the processed image. A variety of standard resolution formats are used in the image sensing art. For example, a 1.3 megapixel super extended graphics array (SXGA) format has 1280×1024 pixels of resolution while a video graphics array (VGA) format has a resolution of 640×480 pixels.

In accordance with an embodiment of the present invention, in a down-sampling mode the vertical resolution of the raw pixel data is reduced by processor 250 to implement format conversion and also simultaneously achieve a high dynamic range. As one example, consider a down-sampling mode converting a 1.3 megapixel format into VGA. For this case, the down-sampling requires a 1:2 reduction in vertical resolution. One way to achieve down-sampling when there is simple geometric ratio of 1:2 in vertical resolution is to combine data from sets of two rows. For example, for a 1:2 reduction in vertical resolution the raw pixel data can be processed such that line data for each set of two rows is combined by the processor to generate one row of pixels in the final image. By combining two different exposure time images during down-sampling the dynamic range is increased compared with a normal full resolution mode.

As illustrated in FIG. 2, in one embodiment of a down-sampling mode, all of the pixels in an individual row have the same exposure time (a common "row exposure time" for all of the pixels within one individual row). However, in the down-sampling mode each row has its row exposure time assigned according to an alternating sequence of row exposure times. In one implementation, one set of rows has a long row exposure time and another set of rows has a short row exposure time. For example, Row 0, Row 2, Row 4, ... Row M have the same row exposure time t1 while Row 1, Row 3 ... Row M+1 may have a different row exposure time t2. That is, the exposure times vary from row-to-row such as a long exposure row, a short exposure row, and so-on. For the purposes of illustration, a limited set of columns is illustrated, such as Column 0, Column 1, ... Column K. In the down-sampling mode, raw pixel data for pixels of the same type (e.g., the same color or filter type) with different row exposure times that are neighbors along a particular vertical dimension (i.e., comparatively close to each other along the same column) are combined to achieve down-sampling with reduced vertical resolution and also improved dynamic range.

Figure 3A:
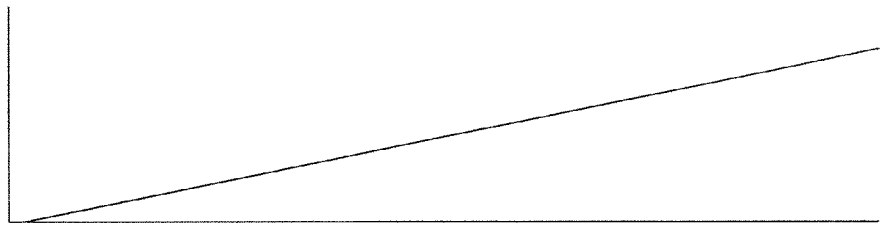
FIGS. 3A, 3B, and 3C illustrate how raw pixel data of two pixels along a vertical dimension with different exposure times are combined during down-sampling to increase dynamic range in accordance with one embodiment of the present invention.
Figure 3B:
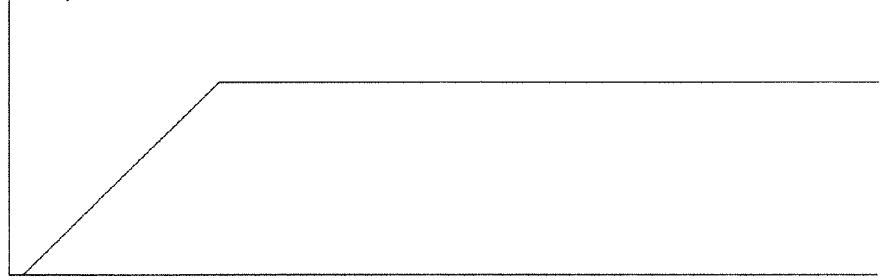
Figure 3C:
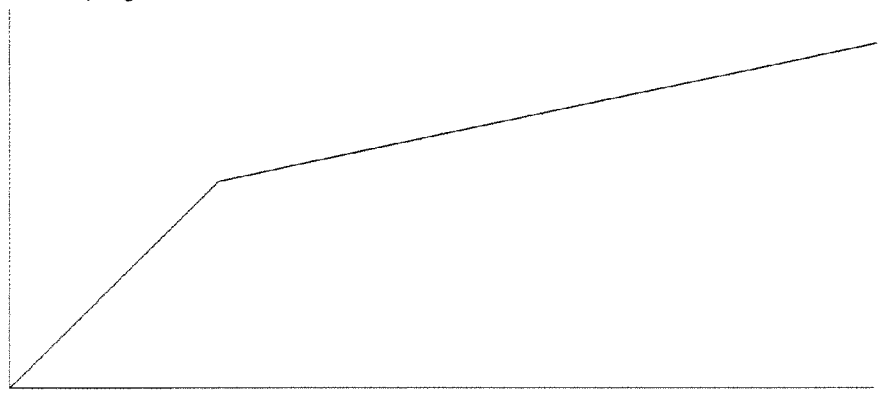

As previously described, processor 250 includes a local line memory to store and synchronize the processing of lines having different row exposure times. In particular the local memory may be used to store sets of long row exposure lines and short row exposure lines sampled at different times to permit data from the lines to be aligned and combined for individual pixels. During down-sampling the processor 250 reads the memory and combines the raw pixel data of pixels that are neighbors along the vertical dimension that are of a compatible type and that have different exposure times. The exposure time of a pixel affects its output response. When a pixel is operated with a long exposure time it will be very sensitive but tend to saturate at a low light level. In contrast, when the pixel is operated with a short exposure time it will have a poor sensitivity but saturate at a higher light level. Thus, by varying the exposure time of rows that will be combined during down-sampling, a high dynamic range is achieved for the down-sampling mode. For example, referring to FIG. 3A, consider a pixel in image sensor 201 corresponding to column 0, row 0. This pixel will have a response determined by its row exposure time, which in this example corresponds to a short row exposure time in which the pixel is not very sensitive but saturates at a high level of light illumination. Referring to FIG. 3B, another pixel in column 0, row 1 has a different row exposure time such that it is more sensitive but saturates at a lower level of light illumination. FIG. 3C illustrates the combined response in the down-sampling mode when the raw pixel data for the two pixels is combined. The combined response, in turn, has a high dynamic range.

Various extensions and modification of the down-sampling mode with high dynamic range are contemplated. In the most general case any down-sampling mode with a 1:N reduction in vertical resolution may be supported, such as 1:2, 1:3, 1:4, and so on. In the general case, the exposure times of the rows may be varied in any interleaved sequence of row exposure times that permits down-sampling to be achieved with increased dynamic range. For example, for down-sampling with a 1:3 reduction in vertical resolution the rows may have a sequence of a long exposure time, medium exposure time, and short exposure time to further increase dynamic range. In this example, during down sampling raw pixel data from a short exposure time, medium exposure time, and long exposure time row would be combined during a 1:3 down-sampling to extend the dynamic range.

The down-sampling mode with high dynamic range is also compatible with a variety of color filter array formats. In the image sensing art a variety of color filter array patterns are applied to an array of pixels to create a color image. The incoming light to each pixel is filtered such that each pixel in the pixel array records only one color, such as red, green, blue. cyan, emerald, or magenta, depending on the type of filter applied to each pixel. Each color filter array pattern is a mosaic in which the color is varied in a sequence across each row of pixels according to a repeating periodic pattern. In turn, the variation in row exposure times in the down-sampling mode can be selected to be compatible with the periodicity of the filter array pattern. For a particular array pattern, the row exposure times used in down-sampling would be selected such that pixels having compatible filter types that are nearby neighbors along a column (vertical dimension) can be combined during down-sampling. Several common color filter array patterns repeat after every two rows. As one example, the Bayer filter array pattern is a RGB filter pattern that is 50% green, 25% red, and 25% blue. In the Bayer pattern a blue-green row of pixels is followed by a green-red row of pixels. The CYGM filter array pattern is a cyan, yellow, green, and magenta pattern of rows of cyan-yellow and green-magenta. Other examples include a RGBE color filter array pattern having rows of red-green and blue-emerald. Patterns that include clear pixels are also contemplated, such a Red-Green-Blue-Clear (RGBC). Another possibility is a Red-Green-Blue-White (RGBW) pattern. As is well known in the imaging art, additional de-mosaicing algorithms can be used to convert the resultant data into a full color image.

Figure 4:
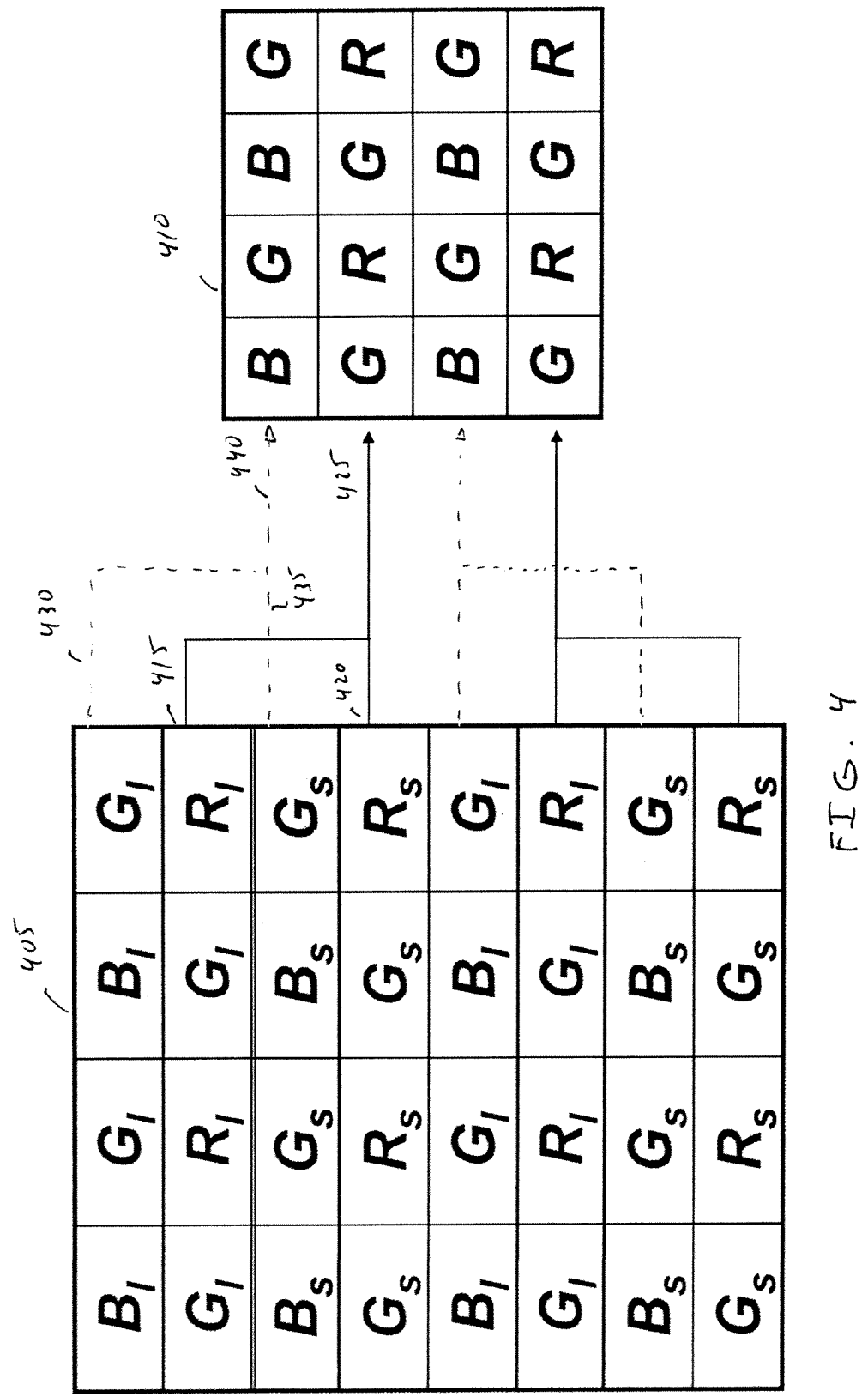
FIG. 4 illustrates an example of a down-sampling mode with a color image pattern filter in accordance with one embodiment of the present invention.

FIG. 4 illustrates a down-sampling mode for a Bayer filter pattern. The left portion 405 is the Bayer filter pattern of the image sensor; the right portion 410 illustrates the result after down-sampling. For the Bayer filter pattern the rows have two color patterns that alternate: Blue-Green-Blue-Green and Green-Red-Green-Red. As illustrated by the subscripts, the pixel rows are further assigned as either long (l) or short (s) exposure time rows. In this example two rows have a long exposure time, two rows a short exposure time, and so on in repeating sequence. The sequence is selected to be compatible with the Bayer pattern, which also repeats after every two rows. Every two adjacent rows having the same row pattern but different exposure times have pixel data combined during down-sampling. Thus, for example, a long exposure time G-R-G-R row 415 is combined with a short exposure time G-R-G-R row 420 to generate a single GRGR row 425 after down-sampling in which the G has combined long and short exposure time pixel data (for the two green pixels from the rows with different exposure times), the R has combined long and short exposure time pixel data (for the two red pixels from the rows with different exposure times), and so on. Similarly a long exposure time BGBG row 430 is combined with a short exposure time BGBG row 435 to generate a single BGBG row 440 after down-sampling. Since many other common filter patterns also repeat after every two rows, it will be understood that the principles illustrated in FIG. 4 are applicable to other filter patterns besides the Bayer pattern.

As previously discussed, the image sensor also supports a conventional line-by-line read out of pixel data for a normal full resolution mode in which each row has the same exposure time. Thus, in a preferred embodiment image sensor 200 has two modes of operations; a normal full resolution mode with limited dynamic range and also a down-sampling mode with reduced vertical resolution but a high dynamic range. Note that only a comparatively small amount of chip real estate is required for the additional pre-charge address module required to provide different exposure times for the rows during down-sampling. The majority of the area of the image sensor is unchanged from the normal resolution mode. Additionally, only comparatively inexpensive modifications to the processor 250 are required to implement the down-sampling mode. In essence "spare lines" are used during down-sampling to achieve a high dynamic range sensing mode at a very low marginal cost.

By way of contrast, in conventional down-sampling schemes the emphasis is typically on reducing noise and the gain and the exposure time of each row is nominally the same in conventional down-sampling. The conventional approach for down-sampling can include either discarding data from a fraction of the lines or performing an averaging of lines having the same identical exposure time. As a result, the conventional down-sampling approaches do not result in a high dynamic range in the down-sampling mode.

As previously described, processor 250 may be implemented as a digital signal processor. It will be understood that processor 250 may implement down-sampling using computer instructions stored on the processor or on a memory accessible to the processor. Consequently, it will also be understood that an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of achieving a high dynamic range in an image sensor having photo-sensitive pixels arranged in a row and column format supporting line-by-line read out of rows, comprising:
   in a normal resolution mode:
      assigning each pixel a same exposure time using a first pre-charge address block which occupies a first area of the image sensor, and
      reading out rows in a line-by-line sequence; and
   in a down-sampling mode:
      using a second pre-charge address block which occupies a second area of the image sensor, assigning each row a row exposure time in which all of the pixels within a particular row have a common exposure time and selecting an alternating sequence of row exposure times along a vertical dimension such that pixels along a vertical dimension that are of a compatible type for combining during down-sampling have at least two different row exposure times, wherein the second pre-charge address block is different from the first pre-charge address block,
      reading out rows in a line-by-line sequence, and
      combining data from sets of rows with different row exposure times in order to simultaneously reduce the vertical resolution and also extend the dynamic range.

2. The method of claim 1, wherein the down-sampling mode is a 1:2 down-sampling mode in which pixel data from sets of two adjacent rows with different row exposure times are combined to reduce vertical resolution.

3. The method of claim 1, wherein the down-sampling mode is a 1:3 down-sampling mode in which pixel data from sets of three adjacent rows with different row exposure times are combined to reduce vertical resolution.

4. The method of claim 1, wherein the down-sampling mode is a 1:N down-sampling mode in which pixel data from sets of N adjacent rows with different row exposure times are combined to reduce vertical resolution.

5. The method of claim 1, further comprising: providing data from either of said steps of reading out rows in a line-by-line sequence to a processor, the processor temporarily storing adjacent lines with different exposure times in memory and performing the combining of data to reduce vertical resolution and extend dynamic range.

6. The method of claim 1, wherein the image sensor further comprises a color filter array with each row having a pre-selected sequence of color filters according to a varying row pattern that repeats after a pre-selected number of rows, wherein said selecting the alternating sequence of row exposure times comprises selecting the alternating sequence of row exposure times to be compatible with said combining data from sets of rows with different exposure times.

7. The method of claim 6, wherein the color filter array has a Bayer pattern with alternating blue-green rows and green-red rows.

8. The method of claim 6, wherein the color filter array is selected from the group consisting of an RGB pattern, a RGBE pattern, a RGBC pattern, a RGBW pattern, and a CYGM pattern.

9. A method of achieving a high dynamic range in an image sensor having photo-sensitive pixels in which individual pixels in an array are each assigned to particular colors by a color filter array pattern having a specified color sequence for each row that repeats after a selected number of rows, comprising:
   in a normal resolution mode:
      assigning each pixel a same exposure time using a first pre-charge address block which occupies a first area of the image sensor, and
      reading out rows in a line-by-line sequence; and
   in a down-sampling mode:
      using a second pre-charge address block which occupies a second area of the image sensor, assigning each row a row exposure time in which all of the pixels within a particular row have a common exposure time and selecting an alternating sequence of row exposure times along a vertical dimension such that pixels along a vertical dimension that are of the same filter type have at least two different row exposure times, wherein the second pre-charge address block is different from the first pre-charge address block,
      reading out rows in a line-by-line sequence, and
      combining data from sets of rows with different row exposure times so that the pixel data from pixels along a vertical dimension having the same filter type are combined to simultaneously reduce vertical resolution and increase dynamic range.

10. The method of claim 9 wherein the down-sampling mode is a 1:N down-sampling mode in which pixel data from sets of N adjacent rows with different row exposure times are combined to reduce vertical resolution.

11. The method of claim 9, wherein the color filter array is selected from the group consisting of an RGB pattern, a RGBE pattern, a RGBC pattern, a RGBW pattern, and a CYGM pattern.

12. An image sensor, comprising:
   an array of photo-sensitive pixels organized into rows and columns; and
   a control block and an address decoder, the control block configured to have a normal resolution mode in which rows are read out in a line-by-line sequence with the rows having the same nominal exposure time and also a down-sampling mode with reduced vertical resolution in which each row has a row exposure time in which all of the pixels within a particular row have a common exposure time and the rows have a sequence of row exposure times along a vertical dimension so that pixels along a vertical dimension that are of a compatible type for combining during down-sampling have at least two different row exposure times,
   wherein the control block comprises:
      a first pre-charge address block which occupies a first area of the image sensor and is configured to support rows having the same nominal exposure time in the normal resolution mode, and
      a second pre-charge address block which occupies a second area of the image sensor and is configured to support different exposure times of rows in the down-sampling mode, wherein the second pre-charge address block is different from the first pre-charge address block.

13. The image sensor of claim 12, wherein individual pixels in the array are each assigned to particular colors by a color array filter pattern having a specified color sequence for each row that repeats after a selected number of rows.

14. The image sensor of claim 13, wherein the sequence of row exposure times is selected so that sets of at least two neighboring rows with the same filter pattern have different exposure times.

15. The image sensor of claim 14, wherein for a filter pattern that repeats after every two rows the row exposure time is varied after every two rows.

16. The image sensor of claim 13, wherein the row exposure time is adjusted between different values based on the periodicity of the filter pattern.

17. The image sensor of claim 12, further comprising: a processor to receive the line-by-line read out of the rows, the processor in the down-sampling mode combining data from sets of rows with different row exposure times to reduce vertical resolution and improve dynamic range.

* * * * *